(12) United States Patent
Lim et al.

(10) Patent No.: US 12,164,361 B2
(45) Date of Patent: Dec. 10, 2024

(54) DISPLAY DEVICE

(71) Applicant: Samsung Display Co., Ltd., Yongin-Si (KR)

(72) Inventors: Hyunho Lim, Yongin-si (KR); Yoosung Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/230,665

(22) Filed: Aug. 7, 2023

(65) Prior Publication Data

US 2024/0231467 A1 Jul. 11, 2024

(30) Foreign Application Priority Data

Jan. 5, 2023 (KR) .......................... 10-2023-0001774

(51) Int. Cl.
*G06F 1/32* (2019.01)
*G06F 1/3234* (2019.01)
*G06F 1/3296* (2019.01)
*G09G 3/3275* (2016.01)
*G09G 3/3291* (2016.01)

(52) U.S. Cl.
CPC .......... *G06F 1/3265* (2013.01); *G06F 1/3296* (2013.01); *G09G 3/3275* (2013.01); *G09G 3/3291* (2013.01); *G09G 2330/021* (2013.01); *G09G 2330/023* (2013.01); *G09G 2330/028* (2013.01)

(58) Field of Classification Search
CPC ... G06F 1/3265; G06F 1/3296; G09G 3/3275; G09G 3/3291; G09G 2330/021; G09G 2330/023; G09G 2330/028

USPC ......................................................... 345/211
See application file for complete search history.

(56) References Cited

U.S. PATENT DOCUMENTS

| 11,270,653 B2 | 3/2022 | Kim et al. | |
|---|---|---|---|
| 11,605,353 B2 | 3/2023 | Sang et al. | |
| 2004/0130544 A1* | 7/2004 | Sun | G09G 3/3648 345/211 |
| 2011/0057724 A1* | 3/2011 | Pabon | H02M 7/219 307/31 |
| 2017/0116922 A1* | 4/2017 | Jung | G09G 3/3258 |

(Continued)

FOREIGN PATENT DOCUMENTS

| KR | 10-2013-0131162 A | 12/2013 |
|---|---|---|
| KR | 10-2021-0147134 A | 12/2021 |
| KR | 10-2022-0022406 A | 2/2022 |

*Primary Examiner* — Tom V Sheng
(74) *Attorney, Agent, or Firm* — Innovation Counsel LLP

(57) ABSTRACT

A display device comprises a display panel including a pixel connected to a data line, a power management circuit including a first voltage generating circuit which generates a first driving voltage and provides the first driving voltage to a data driver in a normal mode, a first voltage converter which generates a parking voltage less than the first driving voltage and provides the parking voltage to the data driver in a low power mode, and a second voltage converter which generates a second driving voltage and provides the second driving voltage to the data driver in the low power mode, and a driving controller configured to receive input image data and to control the data driver and the power management circuit. The data driver provides a data voltage to the data line in the normal mode and provides the parking voltage to the data line in the low power mode.

20 Claims, 11 Drawing Sheets

(56) References Cited

U.S. PATENT DOCUMENTS

| | | | |
|---|---|---|---|
| 2018/0061322 A1* | 3/2018 | Yim | G09G 3/20 |
| 2019/0172379 A1* | 6/2019 | Park | G09G 3/20 |
| 2020/0090590 A1* | 3/2020 | Kim | G09G 3/3233 |
| 2020/0144916 A1* | 5/2020 | Lee | H02M 1/36 |
| 2021/0125559 A1* | 4/2021 | Park | G09G 3/3233 |
| 2021/0280121 A1* | 9/2021 | Nam | G09G 3/3685 |
| 2022/0189412 A1* | 6/2022 | Noh | G09G 3/3275 |
| 2022/0392382 A1* | 12/2022 | Park | G09G 3/3233 |
| 2023/0410742 A1* | 12/2023 | Lee | G09G 3/3233 |
| 2024/0221615 A1* | 7/2024 | Jung | G09G 3/32 |

\* cited by examiner

DISPLAY DEVICE

This application claims priority under 35 USC § 119 to Korean Patent Application No. 10-2023-0001774 filed on Jan. 5, 2023, in the Korean Intellectual Property Office (KIPO), the entire disclosure of which is incorporated by reference herein.

BACKGROUND

1. Field

Embodiments of the present inventive concept relate to a display device. More particularly, embodiments of the present inventive concept relate to a display device capable of controlling a current of a display panel.

2. Description of the Related Art

Generally, a display device may include a display panel and a display panel driver. The display panel may include gate lines, data lines, emission lines and pixels. The display panel driver may include a gate driver for providing gate signals to the gate lines, a data driver for providing data voltages to the data lines, an emission driver for providing emission signals to the emission lines, and a power management circuit for generating a driving voltage. The display panel driver may include a driving controller for controlling the gate driver, the data driver, the emission driver, and the power management circuit.

Meanwhile, in a conventional display device, a power management circuit may generate and provide the same driving voltage to a data driver regardless of an active period and a blank period. Accordingly, a current of a display panel may be large regardless of the active period and the blank period. Therefore, power consumption of the display device may be large.

SUMMARY

Embodiments of the present inventive concept provide a display device capable of controlling a current of a display panel to reducing power consumption of the display device.

Embodiments of the present inventive concept provide a display device capable of controlling a current of a display panel to reducing power consumption of the display device.

In an embodiment of a display device according to the present inventive concept, the display device comprises a display panel including a pixel connected to a data line, a power management circuit, the power management circuit including a first voltage generating circuit which generates a first driving voltage and provides the first driving voltage to a data driver in a normal mode, a first voltage converter which generates a parking voltage less than the first driving voltage and provides the parking voltage to the data driver in a low power mode, and a second voltage converter which generates a second driving voltage and provides the second driving voltage to the data driver in the low power mode, and a driving controller configured to receive input image data and to control the data driver and the power management circuit. The data driver is configured to provide a data voltage to the data line in the normal mode and to provide the parking voltage to the data line in the low power mode.

In an embodiment, the data driver may include a first switching element configured to receive the data voltage and a second switching element configured to receive the parking voltage.

In an embodiment, in the normal mode, the first switching element may be configured to be turned on and the second switching element is configured to be turned off.

In an embodiment, in the low power mode, the first switching element may be configured to be turned off and the second switching element is configured to be turned on.

In an embodiment, the power management circuit may include a third switching element configured to receive the first driving voltage and a fourth switching element configured to receive the second driving voltage.

In an embodiment, in the normal mode, the third switching element may be configured to be turned on and the fourth switching element is configured to be turned off.

In an embodiment, in the low power mode, the third switching element may be configured to be turned off and the fourth switching element is configured to be turned on.

In an embodiment, the data driver may include a first switching element configured to receive the data voltage and a second switching element configured to receive the parking voltage. The power management circuit may include a third switching element configured to receive the first driving voltage and a fourth switching element configured to receive the second driving voltage. In an active low power mode, the first switching element may be configured to be turned on, the second switching element may be configured to be turned off, the third switching element may be configured to be turned off, and the fourth switching element may be configured to be turned on.

In an embodiment, the driving controller may be configured to provide a standby signal to the data driver when the driving controller enters the low power mode.

In an embodiment, the data driver may be configured to enter the low power mode when the driving controller provides the standby signal to the data driver.

In an embodiment, the standby signal is activated in a N+1-th frame when N+1-th frame data is equal to N-th frame data, where N is a positive integer.

In an embodiment, the driving controller may be configured to provide a low voltage conversion signal to the power management circuit and the power management circuit may be configured to enter the low power mode when the driving controller enters the low power mode.

In an embodiment, the first driving voltage generating circuit may be a DC-DC converter.

In an embodiment of a display device according to the present inventive concept, the display device comprises a display panel including a pixel connected to a data line, a data driver configured to provide a data voltage to the data line in a normal mode and to provide a parking voltage to the data line in a low power mode, a power management circuit configured to generate a first driving voltage and to provide the first driving voltage to the data driver in the normal mode and the low power mode, and a driving controller configured to receive input image data and to control the data driver and the power management circuit. The data driver is configured to generate the parking voltage less than the first driving voltage to provide the parking voltage to the data line in the low power mode.

In an embodiment, the data driver may include a first voltage outputter configured to output the data voltage, a second voltage outputter configured to output the parking voltage, and a low voltage switching element connecting the first voltage outputter and the second voltage outputter.

In an embodiment, in the normal mode, the low voltage switching element may be configured to be turned off.

In an embodiment, in the low power mode, the low voltage switching element may be configured to be turned on.

In an embodiment, the data driver may further include a plurality of channel switching elements connecting output terminals of the first voltage outputter to each other. The channel switching elements may be configured to be turned off in the normal mode. The channel switching elements may be configured to be turned on in the low power mode.

In an embodiment, the driving controller may be configured to provide a standby signal to the data driver when the driving controller enters the low power mode.

In an embodiment, the data driver may be configured to enter the low power mode when the driving controller provides the standby signal to the data driver.

According to the display device according to the embodiments, the power management circuit may generate the first driving voltage and provide the first driving voltage in the normal mode, and may generate the parking voltage less than the first driving voltage less than the first driving voltage AVDD and the second driving voltage generated based on the constant current lower than the first driving voltage and provide the parking voltage and the second driving voltage to the data driver in low power mode. Accordingly, power consumption of the display device may be reduced.

According to the display device according to the embodiments, the data driver may convert the first driving voltage into the parking voltage in the low power mode.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, embodiments of the present inventive concept will be described in detail with reference to the accompanying drawings.

Figure 1:
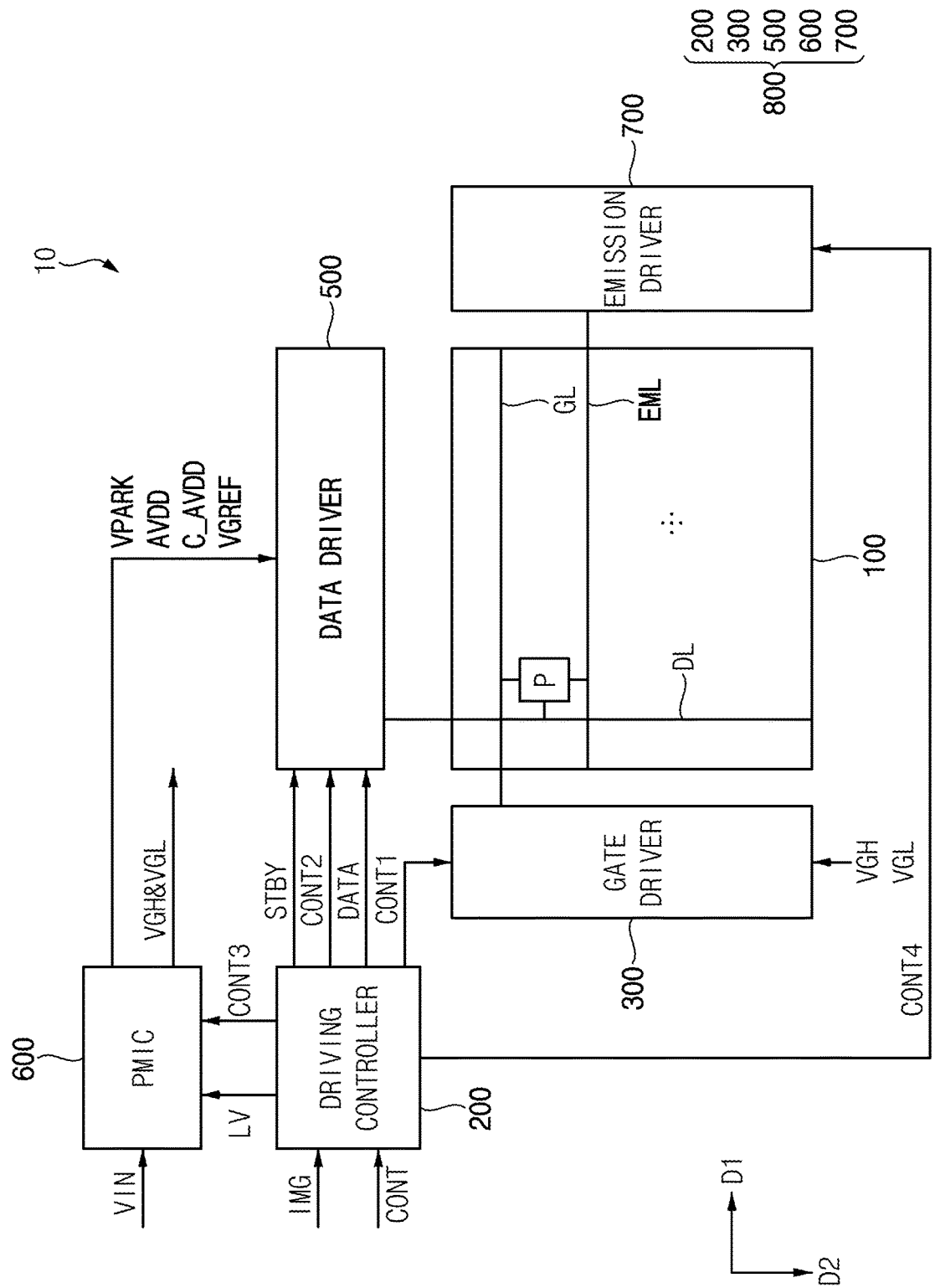
FIG. 1 is a block diagram for illustrating a display device according to embodiments of the present inventive concept.
Figure 2:
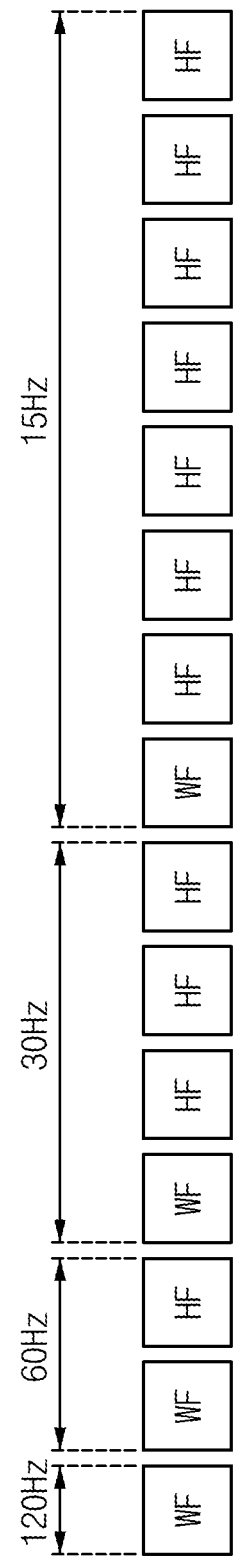
FIG. 2 is a diagram for illustrating an operation of the display device of FIG. 1.

FIG. 1 is a block diagram illustrating a display device 10 according to embodiments of the present inventive concept. FIG. 2 is a diagram for illustrating an operation of the display device 10 of FIG. 1.

Referring to FIGS. 1 and 2, a display device 10 may include a display panel 100 and a display panel driver 800. The display panel driver 800 may include a driving controller 200, a gate driver 300, a data driver 500, a power management circuit 600, and an emission driver 700.

The driving controller 200 and the data driver 500 may be integrally formed. The driving controller 200, the data driver 500, and the power management 600 may be integrally formed. A driving module including at least the driving controller 200 and the data driver 500 which are integrally formed may be referred to as a timing controller embedded data driver (TED).

The display panel 100 may be an organic light emitting diode display panel including organic light emitting diodes. The display panel 100 may be a quantum-dot organic light emitting diode display panel including organic light emitting diodes and quantum-dot color filters. The display panel 100 may be a quantum-dot nano light emitting diode display panel including nano light emitting diodes and quantum-dot color filters.

The display panel 100 may include a display region displaying an image and a peripheral region disposed adjacent to the display region.

The display panel 100 may include gate lines GL, data lines DL, emission lines EML, and pixels P electrically connected to the gate lines GL, the data lines DL, and the emission lines EML.

The driving controller 200 may receive input image data IMG and an input control signal CONT from an external host processor (e.g., a graphics processing unit (GPU), an application processor, or a graphics card). For example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the third control signal CONT3 for controlling an operation of the power management circuit 600 based on the input control signal CONT, and output the third control signal CONT3 to the power management circuit 600.

The driving controller 200 may generate the fourth control signal CONT4 for controlling an operation of the emission driver 700 based on the input control signal CONT, and output the fourth control signal CONT4 to the emission driver 700.

The driving controller 200 may generate the data signal DATA based on the input image data IMG. The driving controller 200 may output the data signal DATA to the data driver 500.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated in the peripheral region of the display panel 100.

The data driver 500 may receive the second control signal CONT2 and the data signal DATA from the driving controller 200. The data driver 500 may convert the data signal DATA into data voltages in analog form. The data driver 500 may output the data voltages to the data lines DL.

The power management circuit 600 may generate a first driving voltage AVDD, a second driving voltage C_AVDD, and a parking voltage VPARK based on an input voltage VIN in response to the third control signal CONT3 received from the driving controller 200. The power management circuit 600 may further generate a gamma reference voltage VGREF and gate driving voltages VGH, VGL based on the first driving voltage AVDD. Alternatively, the power management circuit 600 may generate the gamma reference voltage VGREF and the gate driving voltages VGH and VGL based on the input voltage VIN.

The emission driver 700 may generate emission signals for driving the emission lines EML in response to the fourth control signal CONT4 received from the driving controller 200. The emission driver 700 may output the emission signals to the emission lines EML.

FIG. 1 illustrates that the gate driver 300 is disposed on a first side of the display panel 100 and the emission driver 700 is disposed on a second side of the display panel 100 for convenience of description, but the present inventive concept is not limited to this. For example, both the gate driver 300 and the emission driver 700 may be disposed on the first side of the display panel 100. For example, the gate driver 300 and the emission driver 700 may be integrally formed.

The display device 10 may be driven in a variable refresh rate (VRR) method in which a driving frequency of the display device 10 changes. In an embodiment, the display device 10 may be driven at a first driving frequency, a second driving frequency, a third driving frequency, and a fourth driving frequency. For example, the first driving frequency may be 120 Hz, the second driving frequency may be 60 Hz, the third driving frequency may be 30 Hz, and the fourth driving frequency may be 15 Hz.

A driving cycle of the display device 10 includes only one writing frame WF, or one writing frame WF and at least one holding frame HF following the writing frame WF. The writing frame WF may be a frame period in which the data voltages are provided to the pixels P. The holding frame HF may be a frame period in which the data voltages provided to the pixels P in the writing frame WF are maintained. The writing frame WF may include an active period AP and a blank period BP. The holding frame HF may include only the blank period BP. The active period AP may be a period in which the data voltages are applied to the pixels P during the frame period. The blank period BP may be a period in which the data voltages are not applied to the pixels P during the frame period.

When the driving frequency of the display device 10 is a maximum driving frequency (e.g., 120 Hz), the driving cycle of the display device 10 may include only one writing frame WF. When the driving frequency of the display device 10 is less than the maximum driving frequency, the driving cycle of the display device 10 may include one writing frame WF and at least one holding frame HF. For example, when the driving frequency of the display device 10 is 60 Hz, the driving cycle of the display device 10 may include one writing frame WF and one holding frame HF. For example, when the driving frequency of the display device 10 is 30 Hz, the driving cycle of the display device 10 may include one writing frame WF and three holding frames HF. For example, when the driving frequency of the display device 10 is 15 Hz, the driving cycle of the display device 10 may include one writing frame WF and seven holding frames HF.

Figure 3:
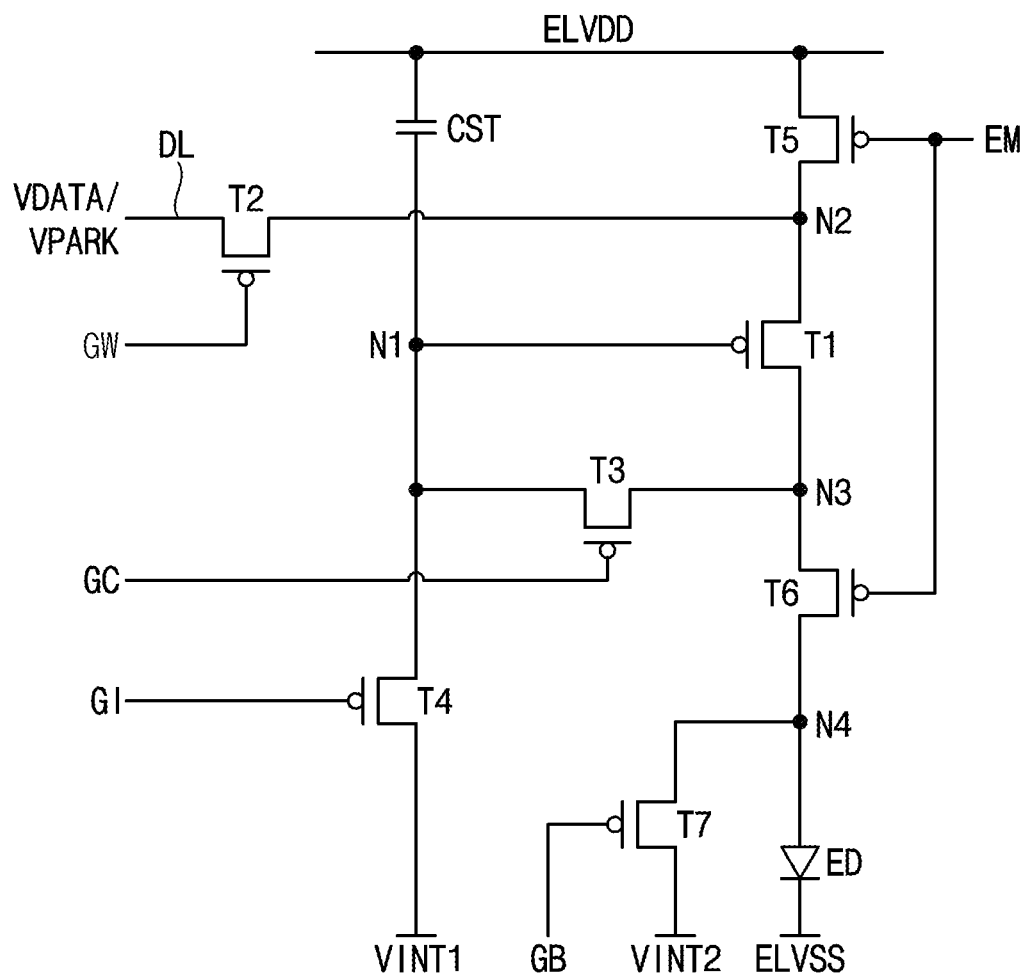
FIG. 3 is a circuit diagram illustrating an example of a pixel in FIG. 1.

FIG. 3 is a circuit diagram illustrating an example of a pixel P in FIG. 1.

Referring to FIGS. 1 to 3, the display panel 100 may include the pixel P, and the pixel P may include a light emitting element ED.

A first transistor T1 may include a gate electrode connected to a first node N1, a first electrode connected to a second node N2, and a second electrode connected to a third node N3.

A second transistor T2 may include a gate electrode receiving a first gate signal GW, a first electrode connected to the data line DL, and a second electrode connected to the second node N2. The data voltage VDATA or the parking voltage VPARK may be provided to the data line DL depending on the driving mode.

The parking voltage VPARK may be a voltage provided and maintained to the data line DL to reduce power consumption in a low power mode. The parking voltage VPARK may be a voltage commonly provided to the data lines DL. The parking voltage VPARK may be lower than the first driving voltage AVDD. For example, the parking voltage VPARK may be determined regardless of the data voltage VDATA. For example, the parking voltage VPARK may be determined based on the data voltage VDATA.

A third transistor T3 may include a gate electrode receiving a second gate signal GC, a first electrode connected to the third node N3, and a second electrode connected to the first node N1.

A fourth transistor T4 may include a gate electrode receiving a third gate signal GI, a first electrode receiving a first initialization voltage VINT1, and a second electrode connected to the first node N1.

A fifth transistor T5 may include a gate electrode receiving the emission signal EM, a first electrode receiving a first power supply voltage ELVDD, and a second electrode connected to the second node N2.

A sixth transistor T6 may include a gate electrode receiving the emission signal EM, a first electrode connected to the third node N3, and a second electrode connected to a fourth node N4.

A seventh transistor T7 may include a gate electrode receiving a fourth gate signal GB, a first electrode receiving a second initialization voltage VINT2, and a second electrode connected to the fourth node N4.

The first to seventh transistors T1 to T7 may be a P-type transistors. The first electrodes of the first to seventh transistors T1 to T7 may be source electrodes. The second electrodes of the first to seventh transistors T1 to T7 may be drain electrodes. Here, the source electrode and the drain electrode may be interchangeably depending on the driving condition.

A storage capacitor CST may include a first electrode receiving the first power supply voltage ELVDD and a second electrode connected to the first node N1.

The light emitting element ED may include an anode electrode connected to the fourth node N4 and a cathode electrode receiving the second power supply voltage ELVDD.

However, this is exemplary, and a structure of the pixel P is not limited thereto.

For example, the first to seventh transistors T1 to T7 may be an N-type transistors.

For example, the first transistor T1, the second transistor T2, and the fifth to seventh transistors T5 to T7 may be the P-type transistors, and the third transistor T3 and the fourth transistor T4 may be the N-type transistor.

Meanwhile, in a conventional display device, a power management circuit may generate and provide the same driving voltage to a data driver regardless of an active period and a blank period. Accordingly, a current of a display panel may be large regardless of the active period and the blank period. Therefore, power consumption of the display device may be large.

Figure 4:
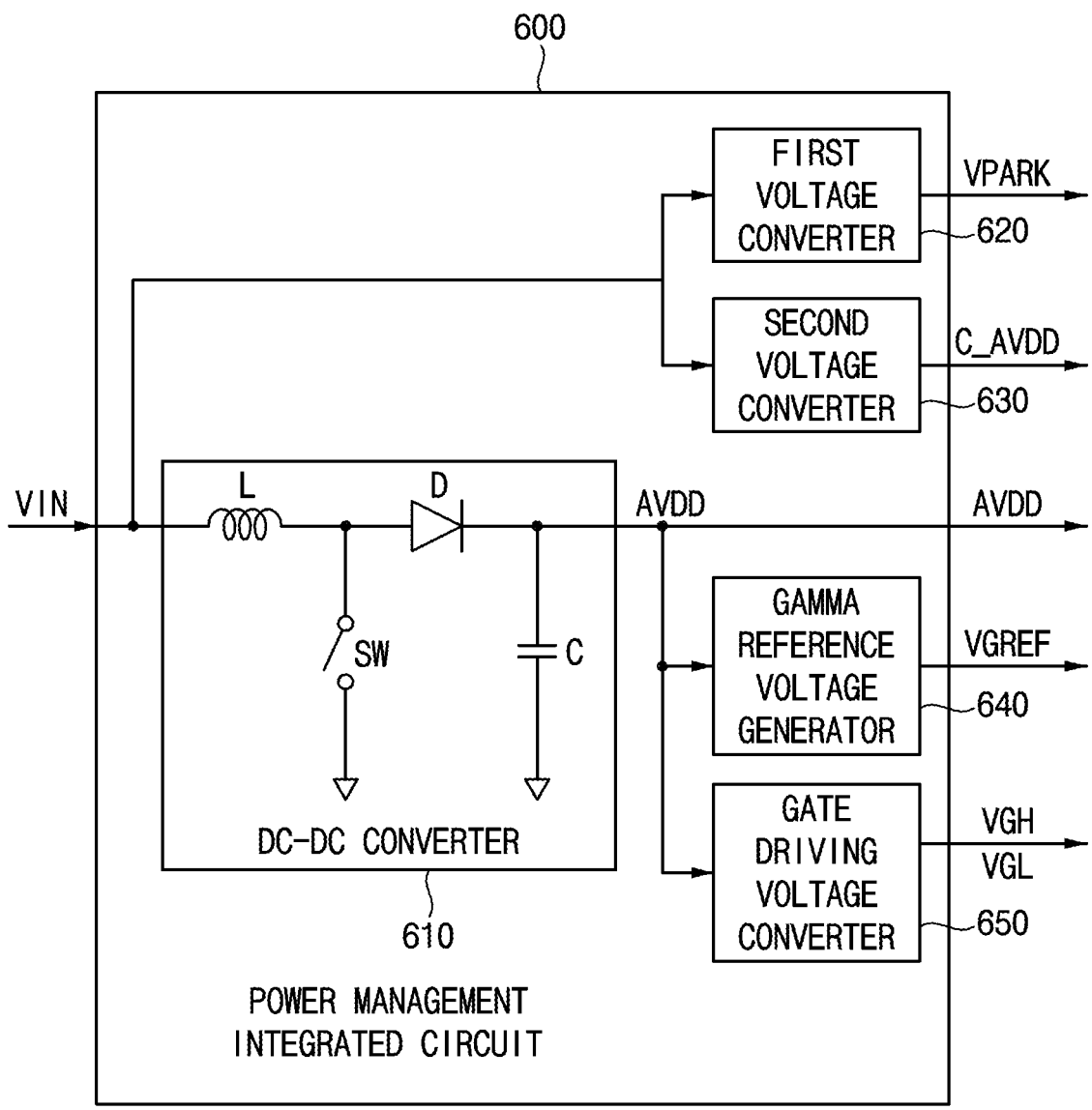
FIG. 4 is a diagram for illustrating an operation of a power management circuit in FIG. 1.

FIG. 4 is a diagram for illustrating an operation of a power management circuit 600 in FIG. 1.

Referring to 1 to 4, the power management circuit 600 may generate the first driving voltage AVDD, the second driving voltage C_AVDD, and the parking voltage VPARK. The power management circuit 600 may further generate the gamma reference voltage VGREF and the gate driving voltages VGH, VGL based on the first driving voltage AVDD. In an embodiment, as shown in FIG. 4, the power management circuit 600 may include the DC-DC converter 610 which converts the input voltage VIN received from the host processor into the first driving voltage AVDD. For example, the DC-DC converter 610 may include an inductor L, a switching element SW, a diode D, and a capacitor C. For example, the DC-DC converter 610 may be a boost converter that boosts the input voltage VIN to the first driving voltage AVDD, but the configuration of the DC-DC converter 610 is not limited thereto. The first driving voltage AVDD may be provided to the data driver 500, and the data driver 500 may be driven based on the first driving voltage AVDD. The second driving voltage C_AVDD may be provided to the data driver 500, and the data driver 500 may be driven based on the second driving voltage C_AVDD.

The power management circuit 600 may include a first voltage converter 620 which generates the parking voltage VPARK based on the input voltage VIN in the low power mode. The parking voltage VPARK generated by the first voltage converter 620 may be provided to the data driver 500.

The power management circuit 600 may include a second voltage converter 630 which generates the second driving voltage C_AVDD based on the input voltage VIN in the low power mode. The second driving voltage C_AVDD generated by the second voltage converter 630 may be provided to the data driver 500.

The power management circuit 600 may further include a gamma reference voltage generator 640 which generates the gamma reference voltage VGREF based on the first driving voltage AVDD. The gamma reference voltage VGREF generated by the gamma reference voltage generator 640 may be provided to the data driver 500. The data driver 500 may generate grayscale voltages (e.g., 256 grayscale voltages) corresponding to all grayscales (e.g., 0-grayscale to 255-grayscale) based on the gamma reference voltage VGREF.

The power management circuit 600 may further include a gate driving voltage generator 650 generating the gate driving voltages VGH, VGL based on the first driving voltage AVDD. The gate driving voltages VGH and VGL generated by the gate driving voltage generator 650 (e.g., a high gate voltage VGH and a low gate voltage VGL) may be provided to the gate driver 300. The gate driver 300 may generate the gate signals based on the high gate voltage VGH and the low gate voltage VGL.

In an embodiment, the first voltage converter 620 and the second voltage converter 630 may be a low-dropout regulator. In an embodiment, the first voltage converter 620 and the second voltage converter 630 may be a charge pump. In an embodiment, the first voltage converter 620 and the second voltage converter 630 may be a level shifter.

Figure 5:
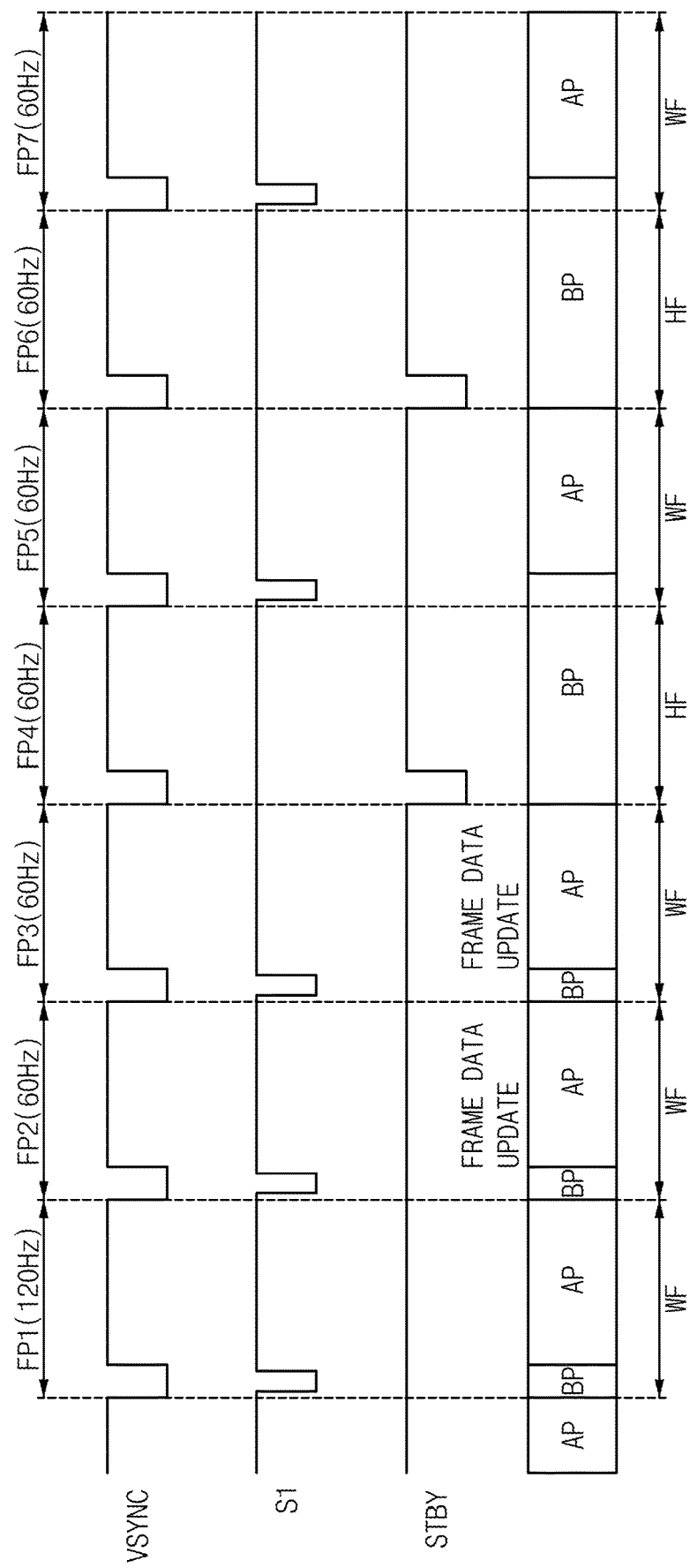
FIG. 5 is a timing diagram for illustrating an operation of the display device of FIG. 1 according to embodiments of the present inventive concept.

FIG. 5 is a timing diagram for illustrating an operation of the display device 10 of FIG. 1 according to embodiments of the present inventive concept.

FIGS. 1 to 5, the power management circuit 600 may operate differently in a normal mode and the low power mode in order to reduce the power consumption of the display device 10.

The normal mode may be a mode in which the power management circuit 600 provides the first driving voltage AVDD to the data driver 500. The low power mode may be a mode in which the power management circuit 600 provides the second driving voltage C_AVDD to the data driver 500 in order to reduce the power consumption of the display device 10. The second driving voltage C_AVDD may generate a constant current lower than a constant current that is generated by the first driving voltage AVDD.

The display device 10 according to embodiments of the present inventive concept may be operated with a fixed driving frequency (e.g., 120 Hz) or may be driven with a variable driving frequency. In the variable driving frequency mode in which the driving frequency is variable, the driving frequency of the display device 10 may be altered by changing a length of the blank period BP. That is, the driving controller 200 may control the data driver 500 and the gate driver 300 to drive the display panel 100 with the variable driving frequency corresponding to a variable frame frequency. For example, a variable frame frequency may have a range of 1 Hz to 120 Hz, but is not limited thereto.

For example, as shown in FIG. 5, the display device 10 may be driven with a first driving frequency in a first frame period FP1 and may be driven with a second driving frequency in a second to seventh frame period FP2 to FP7. For example, the first driving frequency may be 120 Hz and the second driving frequency may be 60 Hz. That is, the driving frequency of the display device 10 may be changed from 120 Hz to 60 Hz.

In an embodiment, in a normal driving mode which is the normal mode, the display panel 100 may include only the writing frame WF. In an embodiment, when a first start signal S1 is activated, the driving controller 200 may operate the display panel 100 in the normal mode.

In an embodiment, in a low frequency driving mode which is the low power mode, the display panel 100 may include one writing frame WF and at least one holding frame HF.

When the driving controller 200 enters the low power mode, the driving controller 200 may provide a standby signal STBY to the data driver 500. When the standby signal STBY is provided to the data driver 500, the data driver 500 may enter the low power mode. When N+1-th frame data is equal to N-th frame data, the standby signal SYBY may be activated in the N+1-th frame. N may be a positive integer.

For example, as shown in FIG. 5, when frame data of the third frame period FP3 is equal to frame data of the fourth frame period FP4, the standby signal STBY may be activated in the fourth frame FP4. When the standby signal STBY is activated in the fourth frame FP4, since the fourth frame data is equal to the third frame data, the length of the blank period BP in the fourth frame may be increased.

When the driving controller 200 enters the low power mode, the driving controller 200 may provide a low voltage conversion signal LV to the power management circuit 600. When the low voltage conversion signal LV is provided to the power management circuit 600, the power management circuit 600 may enter the low power mode.

Figure 6A:
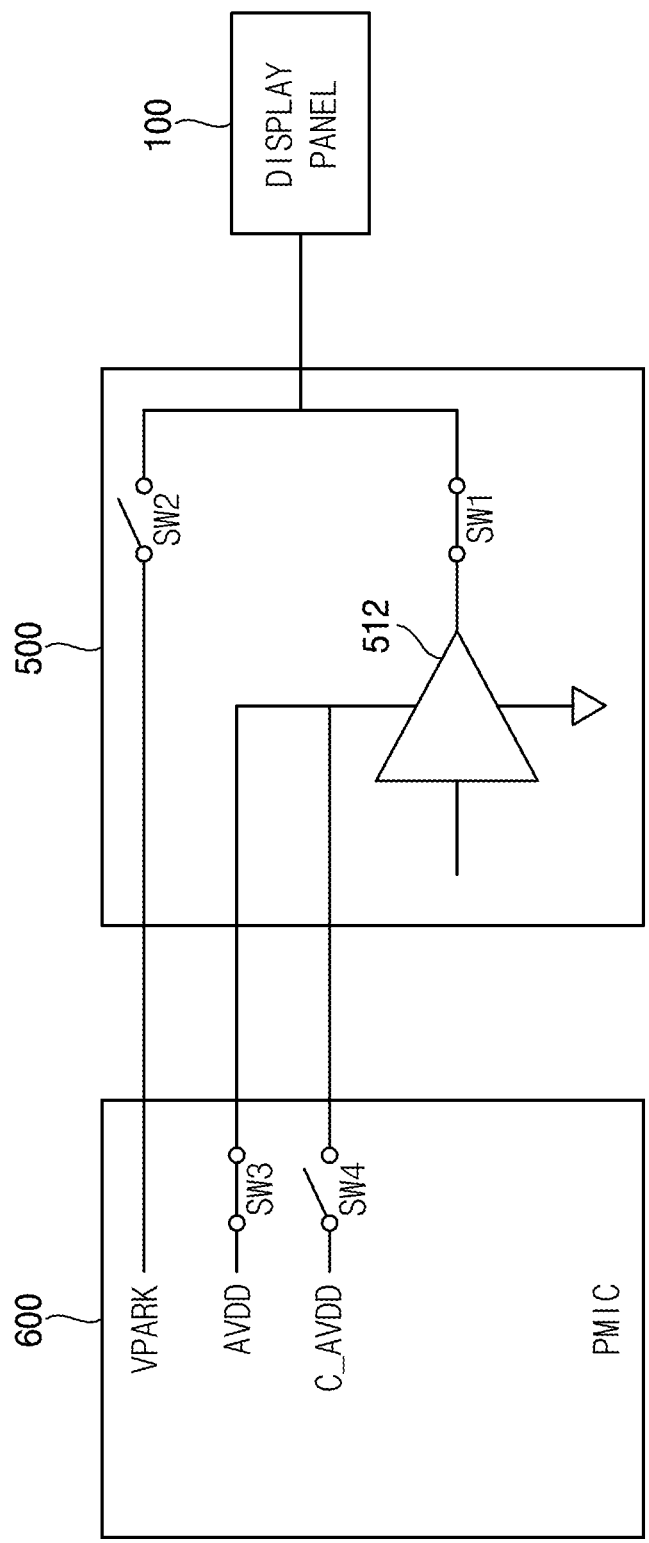
FIGS. 6A, 6B and 6C are block diagram for illustrating operations of a data driver and a power management circuit according to embodiments of the present inventive concept.
Figure 6B:
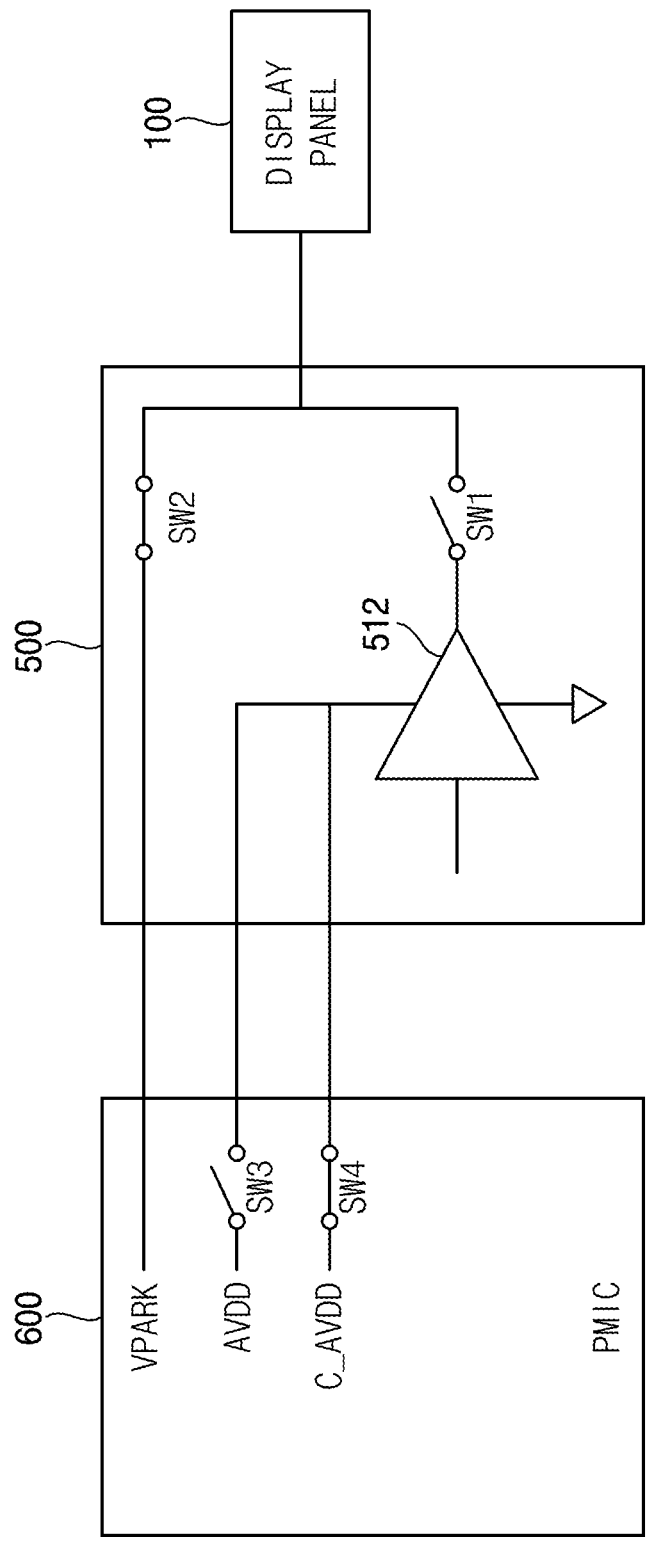
Figure 6C:
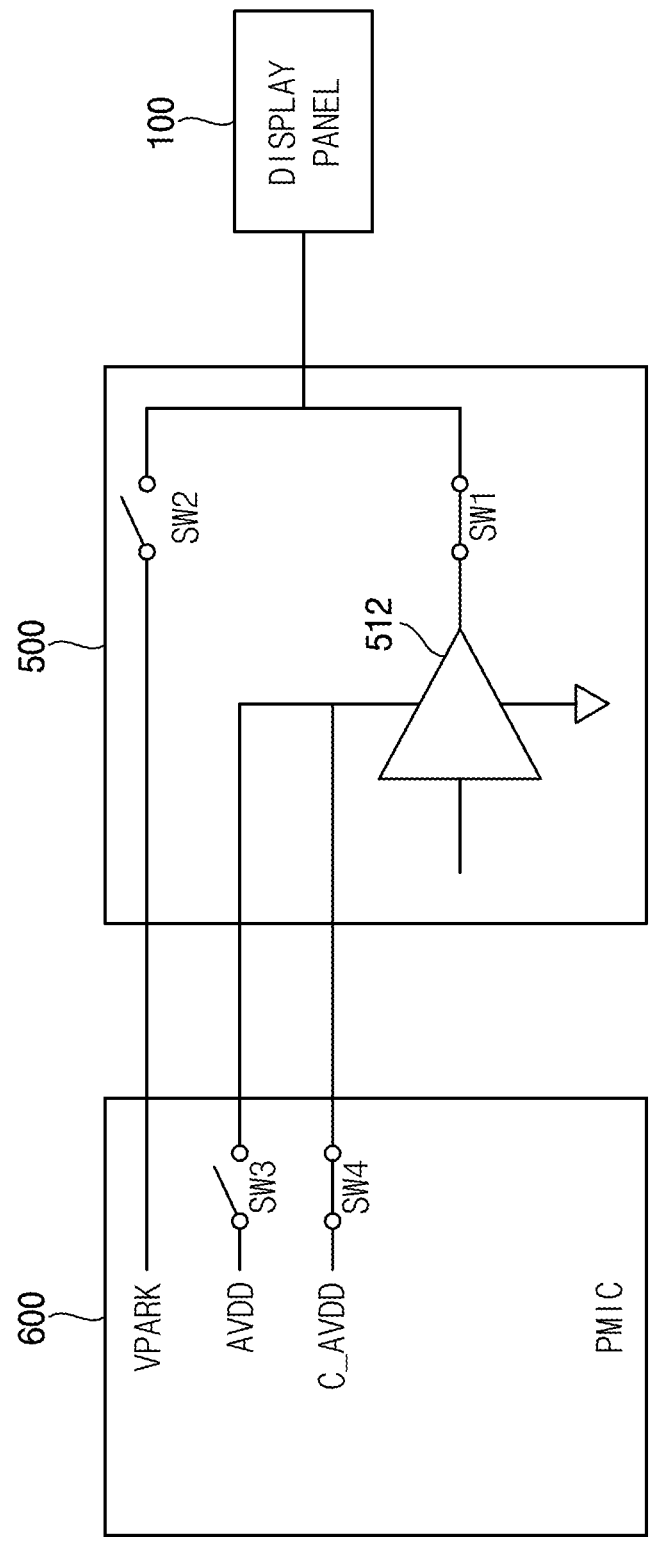

FIGS. 6A to 6C are block diagram for illustrating operations of a data driver 500 and a power management circuit 600 according to embodiments of the present inventive concept.

FIGS. 1 to 6C, the data driver 500 may include a first switching element SW1 receiving the data voltage VDATA and a second switching element SW2 receiving the parking voltage VPARK.

The data driver 500 may include a first buffer 512 outputting the data voltage VDATA. The first switching element SW1 may be disposed between the first buffer 512 and the display panel 100 and the first switching element SW1 may be connected between the first buffer 512 and the display panel 100. The second switching element SW2 may be connected to the display panel 100.

As shown in FIG. 6A, in the normal mode, the first switching element SW1 may be turned on and the second switching element SW2 may be turned off. In the normal mode, the power management circuit 600 may provide the first driving voltage AVDD to the data driver 500. In the normal mode, the first driving voltage AVDD may be applied to a power supply terminal of the first buffer 512. The data driver 500 may generate the grayscale voltages (e.g., 256 grayscale voltages) respectively corresponding to the grayscales (e.g., 0-grayscale to 255-grayscale) using the first driving voltage AVDD. The grayscale voltages may be the data voltages VDATA. Therefore, in the normal mode, the data driver 500 may provide the data voltage VDATA to the data line DL included in the display panel 100 using the first driving voltage AVDD.

As shown in FIG. 6B, in the low power mode, the first switching element SW1 may be turned off and the second switching element SW2 may be turned on. In the low power mode, the power management circuit 600 may generates the parking voltage VPARK less than the first driving voltage AVDD and the second driving voltage C_AVDD which generate the constant current lower than the constant current generated by the first driving voltage AVDD, and may provide the parking voltage VPARK and the second driving voltage C_AVDD to the data driver 500. In the low power mode, the second driving voltage C_AVDD may be provided to the power supply terminal of the first buffer 512. In the low power mode, the data driver 500 may provide the parking voltage VPARK to the data line DL included in the display panel 100.

The power management circuit 600 may include a third switching element SW3 receiving the first driving voltage AVDD and a fourth switching element SW4 receiving the second driving voltage C_AVDD. The third switching element SW3 may be connected to the power supply terminal of the first buffer 512. The fourth switching element SW4 may be connected to the power supply terminal of the first buffer 512.

As shown in FIG. 6A, in the normal mode, the third switching element SW3 may be turned on and the fourth switching element SW4 may be turned off. As shown in FIG. 6B, in the low power mode, the third switching element SW3 may be turned off and the fourth switching element SW4 may be turned on.

As such, in the low power mode, the power management circuit 600 may generate the parking voltage VPARK based on the input voltage VIN to provide the parking voltage VPARK to the display panel 100, and may generate the second driving voltage C_AVDD based on the input voltage VIN to provide the second driving voltage C_AVDD to the data driver 500. Accordingly, the power consumption of the display device 10 may be reduced by reducing power consumption of the display panel 100, the data driver 500, or the power management circuit 600.

In an embodiment, the driving controller 200 may enter an active low power mode in some period of the writing frame WF. For example, some period may be a period in which the display panel 100 operates at low luminance due to a low grayscale voltage. As shown in FIG. 6C, in the active low power mode, the first switching element SW1 may be turned on, the second switching element SW2 may be turned off, the third switching element SW3 may be turned off, and the fourth switching element SW3 may be turned off, and the switching element SW4 may be turned on.

In the active low power mode, the second driving voltage C_AVDD may be provided to the power supply terminal of the first buffer 512 through the fourth switching device SW4. The first buffer 512 may generate the data voltage VDATA based on the second driving voltage C_AVDD. The data voltage VDATA generated by the first buffer 512 may be provided to the display panel 100 through the first switching element SW1.

Figure 7A:
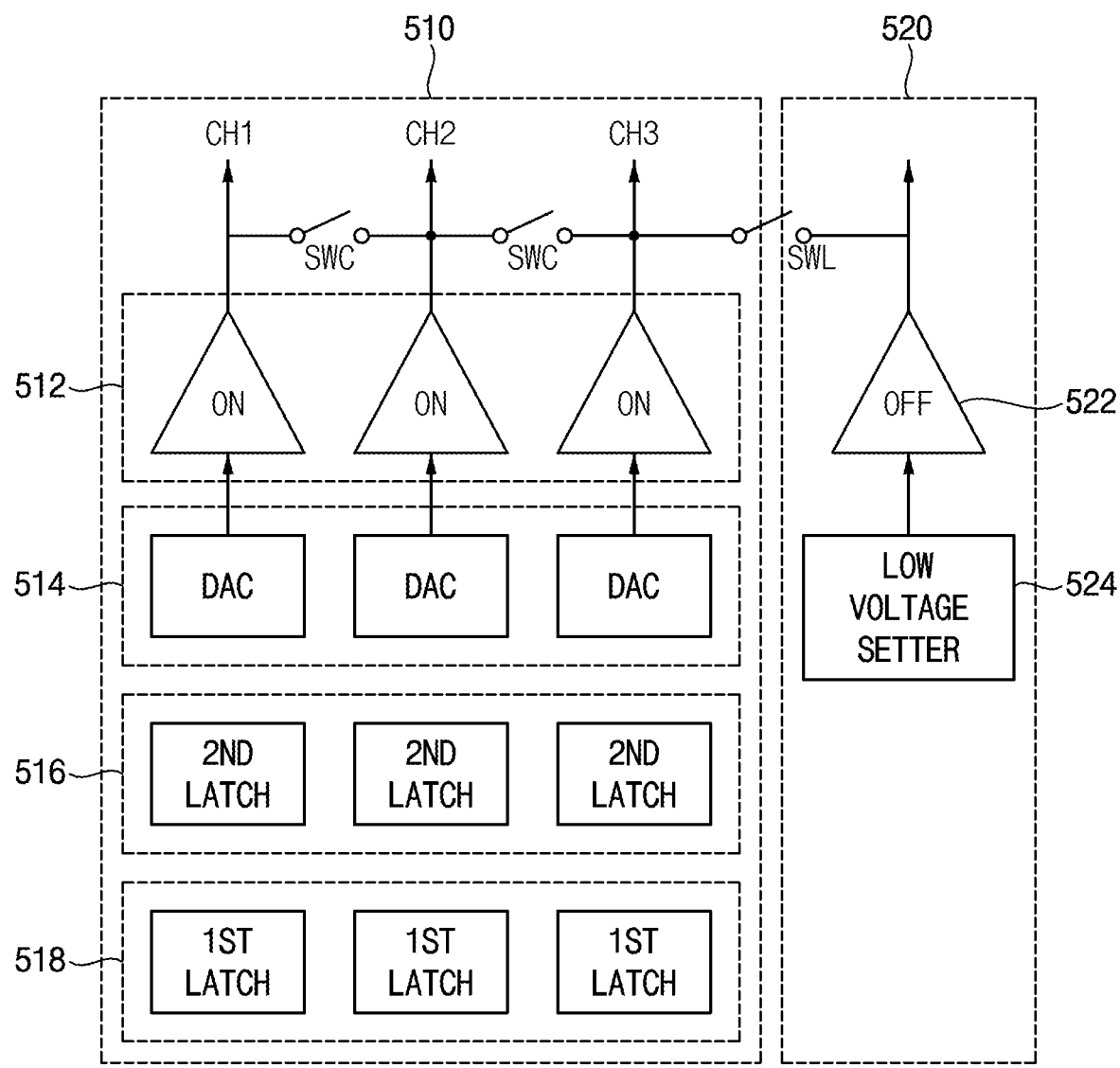
FIGS. 7A and 7B are block diagram for illustrating an operation of a data driver according to embodiments of the present inventive concept.
Figure 7B:
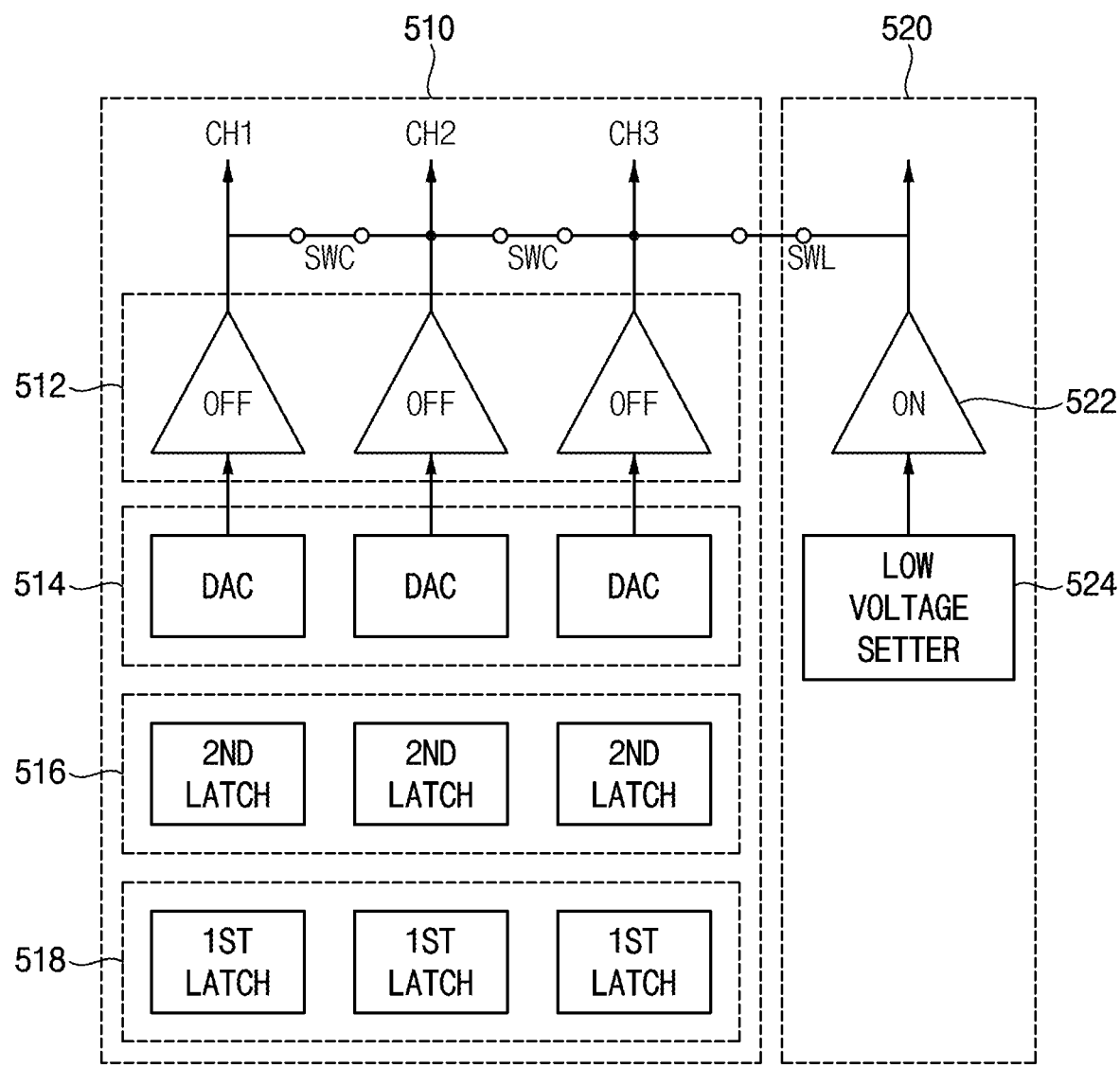

FIGS. 7A and 7B are block diagram for illustrating an operation of a data driver 500 according to embodiments of the present inventive concept.

Referring to FIGS. 1 to 7B, the data driver 500 may generate a parking voltage VPARK lower than a first driving voltage AVDD. The data driver 500 may include a first voltage outputter 510 and a second voltage outputter 520. The first voltage outputter 510 may include first buffers 512, digital-to-analog converters 514, second latches 516, and first latches 518. The second voltage outputter 520 may include a second buffer 522 and a low voltage setter 524.

In an embodiment, the data driver 500 may include the first voltage outputter 510 which outputs the data voltages VDATA, the second voltage outputter 520 which outputs the parking voltage VPARK, and a low voltage switching element SWL connecting the first voltage outputter 510 and the second voltage outputter 520. The data driver 500 may further include channel switching elements SWC connecting output terminals CH1, CH2, and CH3 of the first buffers 512 included in the first voltage outputter 510 to each other. FIGS. 7A and 7B show that the first voltage outputter 510 includes three first buffers 512 for convenience of explanation, but the present inventive concept is not limited thereto. The first voltage outputter 510 may include more than three first buffers 512.

In the normal mode, the power management circuit 600 may provide the first driving voltage AVDD to the data driver 500, and the first voltage outputter 510 may not be connected to the second voltage outputter 520. As shown in FIG. 7A, in the normal mode, the low voltage switching element SWL may be turned off. In addition, the channel switching elements SWC may also be turned off. In the normal mode, the first voltage outputter 510 may generate the data voltage VDATA using the first driving voltage AVDD, and the data driver 500 may provide the data voltages VDATA to the data lines DL included in the display panel 100.

In the low power mode, the power management circuit 600 may provide the first driving voltage AVDD to the data driver 500, and the first voltage outputter 510 may be connected to the second voltage outputter 520. As shown in FIG. 7B, in the low power mode, the low voltage switching element SWL may be turned on. In addition, the channel switching elements SWC may also be turned on. In the low power mode, the second voltage outputter 520 may generate the parking voltage VPARK, and the data driver 500 may provide the parking voltage VPARK to the data lines DL included in the display panel 100.

As such, in the low power mode, the power management circuit 600 may generate the parking voltage VPARK based on the input voltage VIN to provide the parking voltage VPARK to the display panel 100, and may generate the second driving voltage C_AVDD based on the input voltage VIN to provide the second driving voltage C_AVDD to the data driver 500 in the display panel 100. Accordingly, the power consumption of the display device 10 may be reduced by reducing power consumption of the display panel 100, the data driver 500, or the power management circuit 600.

Figure 8:
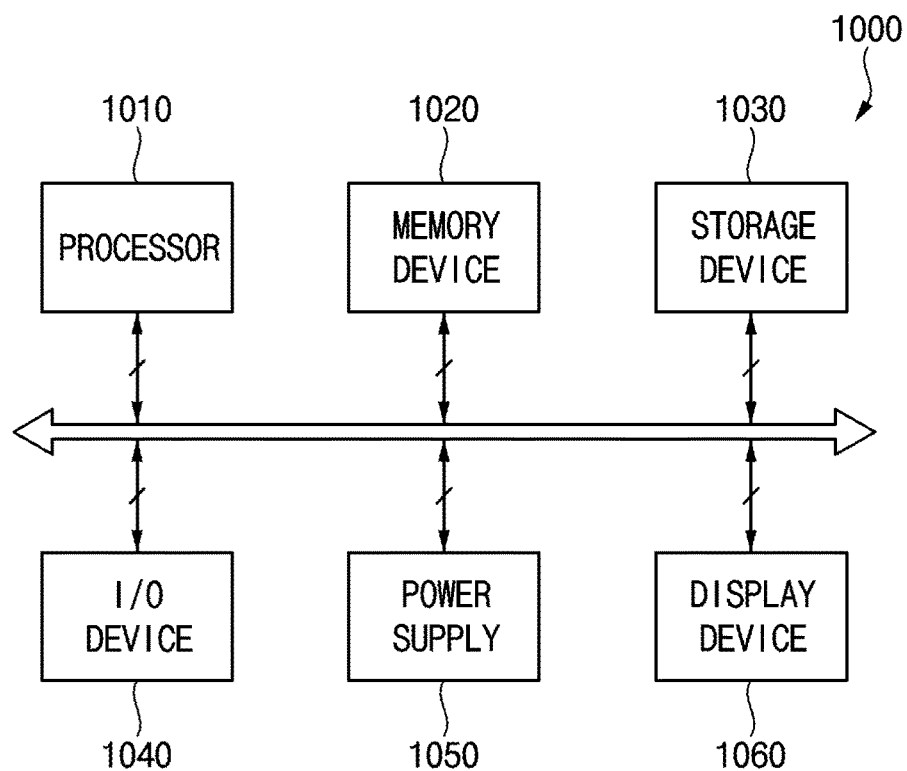
FIG. 8 is a block diagram illustrating an electronic device.
Figure 9:
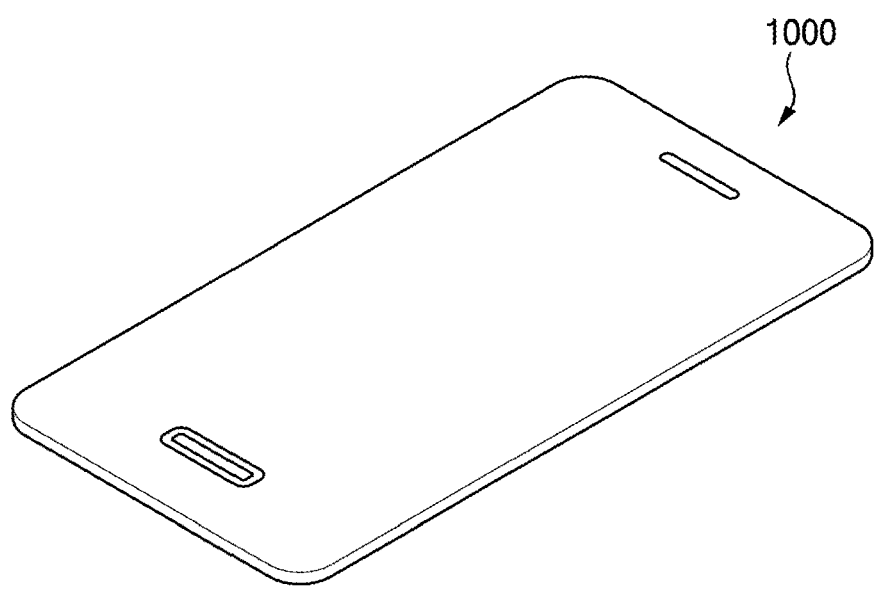
FIG. 9 is a diagram illustrating an embodiment in which the electronic device of FIG. 8 is implemented as a smart phone.

FIG. 8 is a block diagram illustrating an electronic device 1000. FIG. 9 is a diagram illustrating an embodiment in which the electronic device 1000 of FIG. 8 is implemented as a smart phone.

Referring to FIGS. 8 and 9, the electronic device 1000 may include a processor 1010, a memory device 1020, a storage device 1030, an input/output (I/O) device 1040, a power supply 1050, and a display device 1060. The display device 1060 may be the display device of FIG. 1. In addition, the electronic device 1000 may further include a plurality of ports for communicating with a video card, a sound card, a memory card, a universal serial bus (USB) device, other electronic devices, and the like.

In an embodiment, as illustrated in FIG. 9, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device, comprising:
   a display panel including a pixel connected to a data line;
   a power management circuit, the power management circuit including:
   a first voltage generating circuit which generates a first driving voltage and provide the first driving voltage to a data driver in a normal mode;
   a first voltage converter which generates a parking voltage less than the first driving voltage and provides the parking voltage to the data driver in a low power mode;
   a second voltage converter which generates a second driving voltage and provides the second driving voltage to the data driver in the low power mode, and
   a driving controller which receives input image data and controls the data driver and the power management circuit,
   wherein the data driver provides a data voltage to the data line in the normal mode and provides the parking voltage to the data line in the low power mode.

2. The display device of claim 1, wherein the data driver includes a first switching element configured to receive the data voltage and a second switching element configured to receive the parking voltage.

3. The display device of claim 2, wherein, in the normal mode, the first switching element is configured to be turned on and the second switching element is configured to be turned off.

4. The display device of claim 2, wherein, in the low power mode, the first switching element is configured to be turned off and the second switching element is configured to be turned on.

5. The display device of claim 1, wherein the power management circuit includes a third switching element configured to receive the first driving voltage and a fourth switching element configured to receive the second driving voltage.

6. The display device of claim 5, wherein, in the normal mode, the third switching element is configured to be turned on and the fourth switching element is configured to be turned off.

7. The display device of claim 5, wherein, in the low power mode, the third switching element is configured to be turned off and the fourth switching element is configured to be turned on.

8. The display device of claim 1, wherein the data driver includes a first switching element configured to receive the data voltage and a second switching element configured to receive the parking voltage,
wherein the power management circuit includes a third switching element configured to receive the first driving voltage and a fourth switching element configured to receive the second driving voltage, and
wherein, in an active low power mode, the first switching element is configured to be turned on, the second switching element is configured to be turned off, the third switching element is configured to be turned off, and the fourth switching element is configured to be turned on.

9. The display device of claim 1, wherein the driving controller is configured to provide a standby signal to the data driver when the driving controller enters the low power mode.

10. The display device of claim 9, wherein the data driver is configured to enter the low power mode when the driving controller provides the standby signal to the data driver.

11. The display device of claim 9, wherein the standby signal is activated in a N+1-th frame when N+1-th frame data is equal to N-th frame data, where N is a positive integer.

12. The display device of claim 1, wherein the driving controller is configured to provide a low voltage conversion signal to the power management circuit and the power management circuit is configured to enter the low power mode when the driving controller enters the low power mode.

13. The display device of claim 1, wherein the first driving voltage generating circuit is a DC-DC converter.

14. A display device, comprising:
a display panel including a pixel connected to a data line;
a data driver configured to provide a data voltage to the data line in a normal mode and to provide a parking voltage to the data line in a low power mode;
a power management circuit configured to generate a first driving voltage and to provide the first driving voltage to the data driver in the normal mode and generate a second driving voltage and to provide the second driving voltage to the data driver in the low power mode; and
a driving controller configured to receive input image data and to control the data driver and the power management circuit,
wherein the data driver is configured to generate the parking voltage less than the first driving voltage to provide the parking voltage to the data line in the low power mode.

15. The display device of claim 14, wherein the data driver includes a first voltage outputter configured to output the data voltage, a second voltage outputter configured to output the parking voltage, and a low voltage switching element connecting the first voltage outputter and the second voltage outputter.

16. The display device of claim 15, wherein, in the normal mode, the low voltage switching element is configured to be turned off.

17. The display device of claim 16, wherein, in the low power mode, the low voltage switching element is configured to be turned on.

18. The display device of claim 17, wherein the data driver further includes a plurality of channel switching elements connecting output terminals of the first voltage outputter to each other,
wherein the channel switching elements are configured to be turned off in the normal mode, and
wherein the channel switching elements are configured to be turned on in the low power mode.

19. The display device of claim 14, wherein the driving controller is configured to provide a standby signal to the data driver when the driving controller enters the low power mode.

20. The display device of claim 19, wherein the data driver is configured to enter the low power mode when the driving controller provides the standby signal to the data driver.

* * * * *